J. LEDWINKA.
REMOVABLE SEAT FOR VEHICLES.
APPLICATION FILED MAR. 21, 1916.
1,251,976.
Patented Jan. 1, 1918.
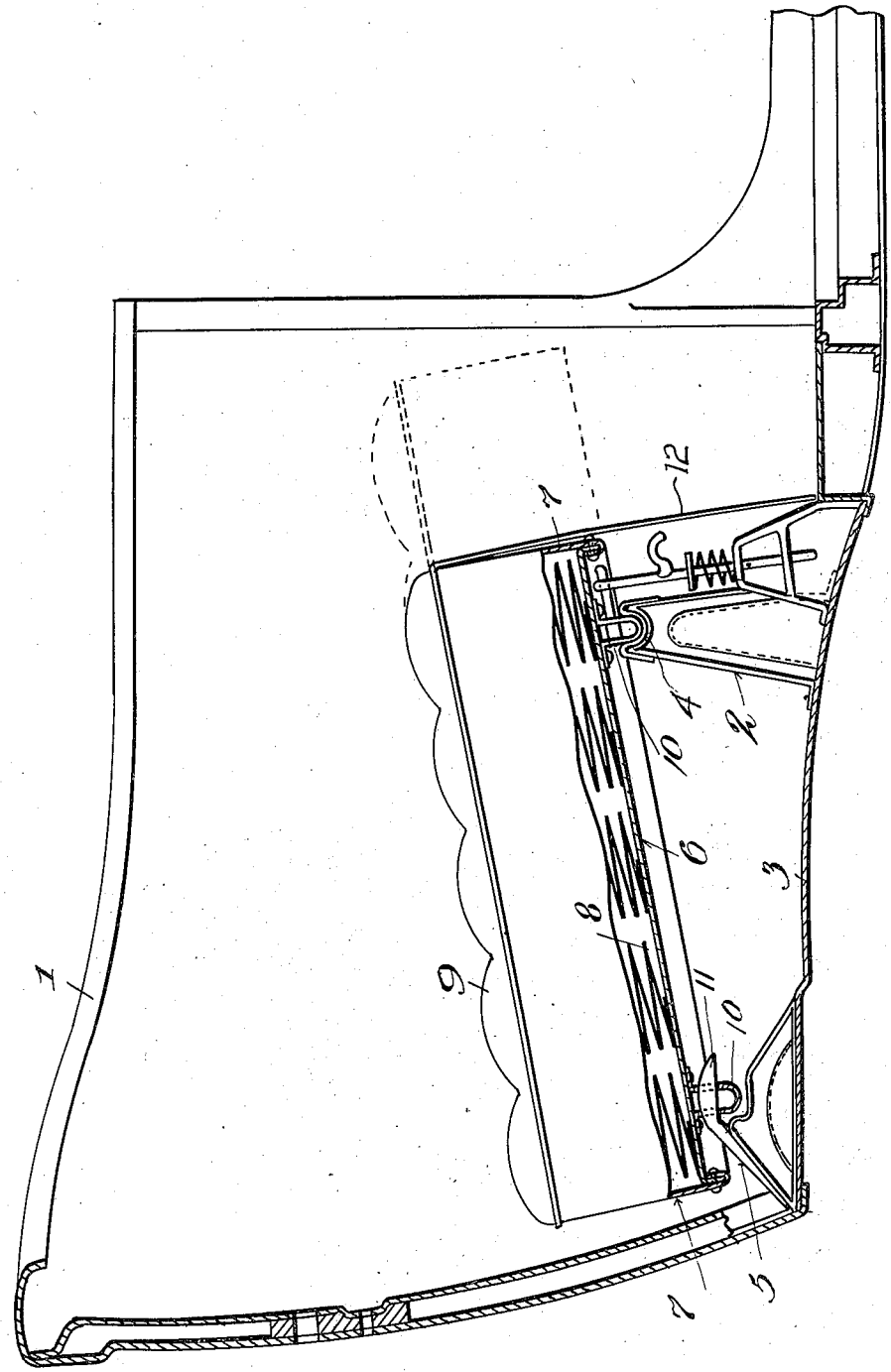

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

REMOVABLE SEAT FOR VEHICLES.

1,251,976.  Specification of Letters Patent.  Patented Jan. 1, 1918.

Original application filed October 20, 1915, Serial No. 56,967. Divided and this application filed March 21, 1916. Serial No. 85,597.

*To all whom it may concern:*

Be it known that I, JOSEPH LEDWINKA, a citizen of the United States, residing at Philadelphia, in the county of Philadelphia, State of Pennsylvania, have made a certain new and useful Invention in Removable Seats for Vehicles, of which the following is a specification.

This invention relates to removable seats for vehicles.

The object of the invention is to provide a seat structure which is simple and efficient and which enables the seat cushions of automobiles or other vehicles to be readily and easily removed or replaced.

Other objects of the invention will appear more fully hereinafter.

The invention consists substantially in the construction, combination, location and relative arrangement of parts, all as will be more fully hereinafter set forth, as shown in the accompanying drawing and finally pointed out in the appended claims.

The drawing shows in its single view a vertical, longitudinal central section of a seat portion of an automobile body having its back and side cushions removed and showing the seat cushions applied in accordance with my invention.

In my pending application Serial No. 56,967, filed October 20, 1915, from which the subject matter of the present application is divided, is shown, described and claimed a structure of automobile body composed of sheet metal stampings pressed to the desired contour and integrally united together to form a body, the object being to secure sufficient strength and rigidity with small weight of material. In carrying out this purpose, and in accordance with my present invention, I propose to employ a seat structure which is simple and efficient and wherein the cushion seat may be readily and easily applied and removed. In the drawing 1 designates the body shell or stamping which constitutes an automobile seat back and side portion. Suitable vertically extending standards, which may be of sheet metal stampings 2, are secured to the floor plate 3, of the tonneau or body and these standards are formed with seats 4 in their upper end. Preferably a standard 2 is located at each side of the tonneau adjacent the front of the seat space. Suitable brackets 5 are secured to the floor plate 3, adjacent the rear wall of the body shell 1, and preferably at opposite sides of the tonneau. The brackets 5 and standards 2, constitute supports upon which rests the seat cushion frame. This frame is made up of steel stampings consisting of a bottom sheet 6, which is flanged at its edges and to which flanges are secured the vertical side members 7 of the seat cushion frame, thereby forming a box or receptacle in which the cushion springs 8 are mounted. The cushion 9 which may be of any suitable or convenient structure is detachably applied to the frame and upon the springs 8 in the ordinary or any well known or convenient manner. Lengthwise of the cushion seat frame and respectively adjacent its front and rear edges and parallel with such edges are applied to the bottom plate or sheet 6 ribs 10. In the form shown these ribs are formed of U-shaped metal stampings. The rib 10 at the front edge of the seat cushion is received and rests in the seats 4, in the upper ends of the standards 2. The rear brackets 5 are provided with forwardly extending hooked shaped members 11, arranged to engage through holes or openings formed in the rear rib 10 to detachably hold the same in place.

From the foregoing description it will be seen that a seat cushion may be readily applied in position by causing the hook members 11 to engage through holes in the rear rib 10, and then lowering the front edge of the cushion frame until the front rib 10 is seated in the upper ends of the standards 2. Similarly a cushion frame may be readily detached and removed by reversing this operation.

If desired the cushion frame may be locked in position when once applied to the tonneau in any suitable or convenient manner.

In order to conceal the space beneath the seat when applied in position, as well as the supporting standards for the seat and the seat frame locking devices I apply a curtain 12 at the front edge of the seat which extends down to the floor plate 3.

While I have shown a specific structure my invention is not to be limited to the exact details thereof. Having now set forth the objects and nature of my invention and a construction embodying the principles thereof, what I claim as new and useful and of my own invention, and desire to secure by Letters Patent, is—

1. An automobile body shell including a floor and seat back and side portions, in combination with vertically extending supporting standards secured to the forward portion of the floor on opposite sides of the seat space and formed into bearing seats at their upper ends, and a removable seat frame resting at its front edge in said bearing seats.

2. An automobile body shell including a floor and seat back and side portions, in combination with vertically extending supporting standards secured to the forward portion of the floor adjacent the seat side portions and having bearing seats at their upper ends, a removable seat frame detachably supported at its front edge in said bearing seats, and means carried at the rear portion of the floor to be detachably engaged with and to support the rear edge of the seat frame.

3. An automobile body shell having vertically extending supporting standards secured to the forward portion of the floor thereof and formed with bearing seats at their upper ends, and a removable seat frame supported at its front edge in said bearing seats, and hook members carried by the body floor at its rear portion and means to detachably engage the rear edge of said frame with said hook members.

4. The combination with an automobile body shell having a floor and seat back and side portions, vertically extending supporting standards carried by the floor at opposite sides of the front portion of the seat space of the body adjacent the seat side portions and supporting brackets also carried by the floor on opposite sides of the seating space adjacent the seat back portion of the body, of a seat frame having longitudinally extending ribs secured to the underside thereof at its front and rear edges, the rib at the front edge being received on and supported by said standards and means carried by the brackets to detachably engage and support the rear rib.

5. An automobile body shell including side seat back and floor portions, said floor having vertically extending supporting standards secured thereto on opposite sides of the seat space at the front portion thereof, adjacent the seat side portions, a seat frame detachably supported at its front edge on said standards and means also carried by the floor at the rear portion thereof adjacent the seat back portion to detachably engage with and support the rear portion of said seat frame.

6. An automobile body shell including side seat back and floor portions, said floor having vertically extending supporting standards secured thereto on opposite sides of the seat space at the front portion thereof adjacent the seat side portions, a removable seat frame loosely resting at its front edge on said standards, means also carried by the floor at the rear portion thereof adjacent the seat back portion to detachably engage with and support the rear portion of said seat frame, and a cover carried by the front edge of said seat frame, said cover extending to the body floor to conceal the space beneath said frame.

7. An automobile body shell including side seat back and floor portions, said floor having vertically extending supporting standards secured thereto on opposite sides of the seat space at the front portion thereof adjacent the seat side portions, brackets carried by the floor on opposite sides of the seating space adjacent the seat back, a seat frame resting at its front edge upon said standards, means carried by said brackets to detachably engage with the rear portion of said seat frame, and means to detachably lock said frame in its applied position.

In testimony whereof I have hereunto set my hand in the presence of the subscribing witnesses, on this 14th day of March, A. D. 1916.

JOSEPH LEDWINKA.

Witnesses:
A. H. BUXBAUM,
L. R. HILYARD.